Patented Feb. 20, 1934

1,948,042

UNITED STATES PATENT OFFICE 1,948,042

PROCESS FOR PRODUCTION OF LUBRICATING OIL

David R. Merrill, Long Beach, and Philip Subkow, Los Angeles, Calif., assignors to Union Oil Company of California, Los Angeles, Calif., a corporation of California No Drawing. Application October 10, 1932
Serial No. 637,210

9 Claims. (Cl. 196—13)

This invention relates to a process for treating petroleum to produce lubricating oil.

The process of treating mineral oil with liquid sulphur dioxide is well known and may be exemplified by the United States Patent No. 911,553, issued to Lazar Edeleanu. The object of subjecting mineral oil to extraction with liquid sulphur dioxide is to separate a fraction, known as raffinate, insoluble in the liquid sulphur dioxide, from the fraction soluble in the liquid sulphur dioxide known as the extract.

In the treatment of mineral oil with liquid sulphur dioxide, the aromatic and non-paraffinic components thereof are dissolved in the liquid sulphur dioxide while the paraffinic components remain undissolved. This extract fraction, being heavier than the undissolved raffinate fraction, tends to form a lower layer upon settling. Thus, upon stratification, one layer may be drawn off from the other or otherwise separated. The sulphur dioxide may then be removed from the extract by evaporation, after which it may be cooled and compressed, liquefied and recycled to the system for further use as an extraction medium. Any sulphur dioxide present in the raffinate phase may be treated similarly.

Due to the excessive pressures necessary to maintain sulphur dioxide liquid at relatively high temperatures it has been found necessary to confine the treatment of mineral oil with liquid sulphur dioxide at relatively low temperatures; for instance, $-10°$ C. When operating at these temperatures, difficulty is frequently encountered because of the excessive viscosity of the oil undergoing treatment whereby the solution of soluble components in the liquid sulphur dioxide is substantially hindered and the separation of the extract solution from the raffinate is substantially impaired.

It is an object of this invention to proceed with the treatment of mineral oils, such as lubricating oils, with liquid sulphur dioxide at low temperatures under such conditions that the viscosity of the lubricating oil is reduced whereby these difficulties may be overcome.

It is a further object of our invention to treat lubricating oil with liquid sulphur dioxide under conditions that will permit operation of the liquid sulphur dioxide solvent process at higher temperatures and still obtain a satisfactory selective solvent action.

We have found that these difficulties may be overcome when another solvent is added to the mixture of oil and liquid sulphur dioxide; for instance, B B' dichlorethyl ether, $ClCH_2 CH_2 O$ $CH_2 CH_2 Cl$, having similar action to the liquid sulphur dioxide by preferentially extracting the aromatic or non-paraffinic components of the oil. Furthermore, we have found in some cases in addition to the dichlorethyl ether, it is desirable to have present with the mixture of lubricating oil and liquid sulphur dioxide a light hydrocarbon such as a petroleum fraction obtained by the rectification of natural gasoline. As an example of such commercially available fractions one composed of 6.72% ethane, 72.2% propane, 19.91% isobutane and 1.17% normal butane may be cited as satisfactory. It will be understood, however, that these merely illustrate the type of fractions which may be used and that the composition may vary. This fraction will hereafter be referred to as "propane" for purposes of simplicity.

In the extraction of certain oils with B B' dichlorethyl ether, alone, it is sometimes found that the raffinate is a viscid mass at the temperature necessary for extraction. This is particularly true when a wax-containing oil is subjected to such treatment. We have found that the presence of liquid sulphur dioxide has a valuable effect in reducing the viscosity of this mixture of oil and dichlorethyl ether whereby more efficient stratification is accomplished.

Therefore, another object of our invention is to treat lubricating oils with a combined solvent comprising liquid sulphur dioxide and dichlorethyl ether either with or without the presence of liquid propane.

For instance, in the operation of my process dichlorethyl ether may be admitted with the liquid sulphur dioxide into the lubricating oil stock to be treated in sufficient quantities to cause a substantial reduction in the viscosity of the mixture thereby facilitating the stratification into the raffinate and extract phases. The amount of dichlorethyl ether to be added depends upon a number of variables; namely, the viscosity and molecular weight of the oil being treated, the temperature at which the liquid sulphur dioxide extraction takes place, the proportion of oil to liquid sulphur dioxide, the amount of fractions of the oil soluble in the liquid sulphur dioxide, and the temperature of the dichlorethyl ether added to the mixture of oil and liquid sulphur dioxide. Preferably, the dichlorethyl ether will be cooled to the temperature at which the solvent extraction with liquid sulphur dioxide is to take place, prior to addition to the oil. The dichlorethyl ether may be added separately or Whereas the viscosity of the mixture of lubricating oil and liquid sulphur dioxide would be too excessive to permit a ready stratification of the raffinate and extract layers if no dichlorethyl ether was present, we have found that the presence of even a small proportion of dichlorethyl ether aids separation and we prefer to add a sufficient amount to substantially accelerate stratification of the extract and raffinate phases during extraction with liquid sulphur dioxide.

As above stated, the dichlorethyl ether has an action similar to the sulphur dioxide in preferentially extracting the aromatic or non-paraffinic components of the oil. Moreover, the dichlorethyl ether exerts a diluting effect on the extract and raffinate phases thus reducing the viscosity and facilitating the mixing operations and phase separation. In addition to these effects, another important advantage gained by the combined use of sulphur dioxide and dichlorethyl ether is that the presence of the latter permits the operation of the extraction with the liquid sulphur dioxide at higher temperatures. A satisfactory selective solvent action at higher temperatures, in turn, results in greater ease of mixing and greater facility for phase separation because the viscosity of the mixture of oil and liquid sulphur dioxide is less at relatively high temperatures, i. e., the mixture is less viscous.

Additionally, we have found that in some cases the use of liquid sulphur dioxide and dichlorethyl ether together as solvents give a degree of refining not readily obtainable by either used alone.

If a further reduction of viscosity is desired the extraction with liquid sulphur dioxide and dichlorethyl ether may take place while the oil is in solution in liquid propane. Sufficient propane should be used to maintain the raffinate phase in the liquid state for better separation and to facilitate transfer of the material from one part of the system to another.

In the commercial application of our process, low temperatures may sometimes be employed at which the wax precipitates out unless sufficient liquid propane is present to keep this wax in solution. Otherwise a viscid mass is obtained which hinders or entirely prevents stratification.

The pressure to be employed in the operation of our process depends upon a number of factors, notably the temperature used and the amount of solvents employed. However, the pressure should be sufficient to accomplish the extraction while the dichlorethyl ether, sulphur dioxide and propane are liquid.

The extract solution is then readily separable from the raffinate by stratification. The sulphur dioxide, dichlorethyl ether and propane, if the latter is used, may then be removed from their respective solutions by fractional distillation. The vapors may then be compressed, cooled and liquefied for re-use.

As an example of the operation of our process we may use Santa Fe Springs dewaxed long residuum having the following characteristics: gravity of 19.9° A.P.I. at 60° F. Saybolt universal viscosities of 1900 at 100° F., 348.5 at 150° F., and 96.5 at 210° F., and a viscosity index of 44, and a pour point of 15° F.

The expression "viscosity index" as used herein refers especially to the index defined by Dean and Davis in Chemical and Metallurgical Engineering, vol. 36, 1929, page 618. The viscosity index of a lubricating oil is an indication of its composition or type, i. e., whether it is a paraffin base or naphthene base oil. Paraffin base oils are arbitrarily assigned a viscosity index of 100, naphthene base oils are assigned a viscosity index of 0, and mixed base oils lie between these extremes. For example, if an oil shows a viscosity index of about 65 or more, it is evident that the oil is predominately paraffinic in nature.

The pour point was determined by the American Society of Testing Materials Method D 97—30.

One volume of this oil, above described, was dissolved in three volumes of liquid propane. The extracting solvent employed was a mixture of B B' dichlorethyl ether and liquid sulphur dioxide in equal parts. The oil was then extracted at 25° F. to 30° F. with a total of three volumes of the mixed solvent by three successive extractions in each of which one volume of the mixed solvent was employed. The raffinate, i. e., that portion insoluble in the mixed solvent, was then freed of propane by distillation. This raffinate had a gravity of 23.9° A. P. I. at 60° F.; Saybolt universal viscosities of 1049 at 100° F., 238 at 150° F. and 80.5 at 210° F., pour point of 35° F. and a viscosity index of 70. This raffinate therefore, resembled a paraffin base lubricating oil although it was derived from naphthenic base stock.

Furthermore, it will be noted that the pour point of the propane-free raffinate was even above the temperature at which the extraction was accomplished. In other words, when propane is omitted, the ether and sulphur dioxide extract is difficultly separable from the raffinate when the temperature of extraction is below the pour point of the raffinate because of the congelation of the latter. But when liquid propane is used in conjunction with the ether and sulphur dioxide, the extract is easily separable from the raffinate solution in propane even when extraction is accomplished below the pour point of the propane-free raffinate.

In some cases we have been able to accomplish the extraction with dichlorethyl ether and liquid sulphur dioxide at temperatures above the pour point of the raffinate in which event little or no liquid propane was necessary to cause ready separation of the extract from the raffinate. In other cases we have preliminarily dewaxed the oil before extraction with dichlorethyl ether and liquid sulphur dioxide whereby the pour point of the raffinate was substantially lowered thereby avoiding the necessity of liquid propane addition.

We have also found that our process may be employed to advantage in separating hydrocarbon mixtures of fractions both heavier and lighter than the lubricating oil fractions.

The foregoing description is merely illustrative of a preferred mode of carrying out our invention and is not to be taken as limiting, as many variations may be made within the scope of the following claims by a person skilled in the art without departing from the spirit thereof.

We claim:

1. A process for the separation of hydrocarbon oil into fractions which comprises extracting said oil with BB' dichlorethyl ether and liquid sulphur dioxide to form a raffinate phase and an extract phase, and separating the extract phase containing fractions dissolved in said dichlorethyl ether and sulphur dioxide from the insoluble raffinate oil phase.

2. A process for the separation of mineral oil into fractions which comprises, extracting said oil with BB' dichlorethyl ether and liquid sulphur dioxide to form a raffinate phase and an extract phase, separating said phases and separating the sulphur dioxide and ββ' dichlorethyl ether from said phases.

3. A process for the separation of hydrocarbon oil into fractions which comprises dissolving said oil in a liquefied normally gaseous hydrocarbon, extracting said oil dissolved in said hydrocarbon with liquid sulphur dioxide and ββ' dichlorethyl ether to form an extract phase and a raffinate phase and separating said phases.

4. A process for the separation of hydrocarbon oil into fractions which comprises dissolving said oil in a liquefied normally gaseous hydrocarbon, extracting said oil dissolved in said hydrocarbon with liquid sulphur dioxide and ββ' dichlorethyl ether to form an extract phase and a raffinate phase, separating said phases and removing the sulphur dioxide, ββ' dichlorethyl ether and liquefied normally gaseous hydrocarbon from said phases.

5. A process as in claim 3 in which the liquefied normally gaseous hydrocarbon is liquid propane.

6. A process for the separation of hydrocarbon oil containing paraffinic and non-paraffinic fractions which comprises extracting said oil with liquid sulphur dioxide and ββ' dichlorethyl ether to separate a paraffinic oil raffinate layer and a non-paraffinic oil extract layer dissolved in said liquid sulphur dioxide and ββ' dichlorethyl ether and separating said layers.

7. A process for the separation of hydrocarbon oil into fractions which comprises dissolving said oil in a liquefied normally gaseous hydrocarbon, extracting said oil dissolved in said hydrocarbon with liquid sulphur dioxide and ββ' dichlorethyl ether to form a raffinate layer dissolved in said hydrocarbon and an extract layer dissolved in liquid sulphur dioxide and ββ' dichlorethyl ether and separating said layers.

8. A process as in claim 7 in which the liquefied normally gaseous hydrocarbon is liquid propane.

9. A process for the separation of mineral oil into fractions which comprises extracting said oil with a selective solvent comprising liquid sulphur dioxide and dichlorethyl ether to form a layer insoluble in said selective solvent and a layer dissolved in said selective solvent and separating said layers.

DAVID R. MERRILL.
PHILIP SUBKOW.